United States Patent [19]
Kameyama et al.

[11] Patent Number: 5,210,557
[45] Date of Patent: May 11, 1993

[54] CAMERA WITH PLURAL LENSES FOR TAKING SEQUENTIAL EXPOSURES

[75] Inventors: Nobuyuki Kameyama; Ko Aosaki, both of Tokyo, Japan

[73] Assignee: Fuji Photo Film Co., Ltd., Kanagawa, Japan

[21] Appl. No.: 746,889

[22] Filed: Aug. 19, 1991

[30] Foreign Application Priority Data

Aug. 17, 1990 [JP] Japan .................................. 2-216594
Aug. 27, 1990 [JP] Japan .................................. 2-225502

[51] Int. Cl.⁵ .............................................. G03B 1/00
[52] U.S. Cl. ...................................... 354/120; 354/125
[58] Field of Search ...................... 354/110, 120, 125; 352/46, 84

[56] References Cited
U.S. PATENT DOCUMENTS

| | | | |
|---|---|---|---|
| 3,016,812 | 1/1962 | Chatlain ........................ | 354/110 X |
| 3,202,069 | 8/1965 | Cummins et al. ................ | 354/120 |
| 3,918,073 | 11/1975 | Henderson et al. ............. | 354/120 |
| 3,995,288 | 11/1976 | Yevick ........................... | 354/120 X |

FOREIGN PATENT DOCUMENTS

566611 2/1924 France .
16-13352 7/1941 Japan .
2-105132 4/1990 Japan .

Primary Examiner—Michael L. Gellner
Assistant Examiner—J. K. Han
Attorney, Agent, or Firm—Young & Thompson

[57] ABSTRACT

A continuous taking camera has a plurality of exposure chambers disposed linearly. Two shutter discs rotated by a motor are provided at the back of the exposure chambers. Each shutter disc is formed with two movable shutter openings at positions different in distance from the axis of rotation of the shutter disc. When the motor is energized by a shutter release operation, the motor causes the two shutter discs to perform one rotation for sequentially opening and closing the exposure chambers starting from an outermost exposure chamber. A 35 mm full size original frame is divided in the longitudinal direction of the film into four sub-frames. Scenes for eight sub-frames are taken using two full size original frames.

20 Claims, 11 Drawing Sheets

CAMERA WITH PLURAL LENSES FOR TAKING SEQUENTIAL EXPOSURES

FIELD OF THE INVENTION

The present invention relates to a camera adapted continuously to take pictures, which can take the same subject a plurality of times at a predetermined time interval upon one release of the shutter.

BACKGROUND OF THE INVENTION

Continuous picture taking is very convenient in the field of sports and the like since the position of a subject at various times can be recorded as still images. Continuous picture taking with a single lens reflex camera is made possible by attaching a motor drive unit to the camera body, the motor drive unit winding a photographic film one frame after another at a high speed. Continuous taking using a motor drive unit has a film transport speed limit of about five frames per second for feeding photographic film in the case of an original frame (36×24 mm) of 35 mm type full size.

In such known cameras, not only does the operation of the film advancing mechanism and shutter unit generate loud noises, but also a mechanism is necessary for synchronizing film advance with shutter release, resulting in a complicated structure and high cost.

Furthermore, since five frames are used for each continuous taking, the consumption of photographic film is great, and so the number of continuous takings per roll of film is small. Still further, photographic paper is cut into separate photoprints of original frames so that even in the case of continuously taken scenes, the photoprints are required to be positioned in the order of taking, when they are observed.

In panoramic photography, an image is taken with a wide angle lens on a laterally elongated panoramic size original frame (36×13.7±0.4 mm) defined by light-shielding the upper and lower sides of an original frame (36×24 mm) of 35 mm full size. This panoramic size original frame is printed as a photoprint of panoramic size (254×89 mm) corresponding to the size of two consecutive photoprints of L size (127×89 mm).

THE KNOWN PRIOR ART

In Japanese Patent Publ. No. 41-13352 and Japanese Patent Laid-Open Publ. No. 2-105132, a continuous taking camera has been proposed wherein one original frame of 35 mm type full size is divided into four (2×2) original sub-frames, and four consecutive scenes are sequentially taken on the four original sub-frames in order in the clockwise or counterclockwise direction upon one shutter release. If a photographic film taken with such a continuous taking camera is printed, a single photoprint of L size (127×89 mm) contains four original sub-frames disposed in vertical and horizontal rows on the photoprint. However, it is difficult to determine the order of continuous taking. In addition, the size of each original sub-frame is too small for convenient viewing. If the size of each original sub-frame is to be made the same as the L size, enlargement printing is required. The enlarged photoprint may be cut into each original sub-frame. Otherwise a special trimming printing may be required. It is inconvenient by any conventional procedure to ensure easy observation of the photoprints.

The above-described continuous taking cameras use independent taking lenses for respective original sub-frames. Thus, the mounting position of each taking lens has to be adjusted precisely. If the adjustment is poor, each original sub-frame has a different focal point. A photographic printer uses a film mask to cut the periphery of an original frame. If four original sub-frames are taken on an original frame of 35 mm full size, the printed four original sub-frames each have a main subject at a position displaced from the center of the original frame.

The continuous taking camera disclosed in the above Japanese Patent Publ. No. 41-13352 takes a plurality of original sub-frames by sequentially activating shutter blades provided for each exposure chamber. This shutter assembly requires shutter blades for each exposure chamber, resulting in an increase in the number of components and hence high cost.

The continuous taking camera disclosed in the above Japanese Patent Laid-Open Publ. No. 2-105132 has a single rotatable shutter disc with one movable shutter opening or slit. Each stationary shutter opening is disposed along a circular locus of the movable shutter opening. Therefore, if a sufficient size of original sub-frame is to be achieved, then the number of original sub-frames is restricted.

OBJECTS OF THE INVENTION

It is therefore a principal object of the present invention to provide a continuous taking camera capable of taking continuous scenes to obtain a photoprint of sufficiently large size without requiring special printing services.

It is another object of the present invention to provide a continuous taking camera for taking continuous scenes on a photographic film while ensuring easy discrimination of the order of taking.

It is a further object of the present invention to provide a continuous taking camera capable of taking continuous scenes while ensuring that each main subject is placed in the same position within each original sub-frame.

It is a still further object of the present invention to provide a continuous taking camera capable of easily adjusting the mounting position of a taking lens.

It is another object of the present invention to provide a continuous taking camera having a shutter unit of simple structure and a small number of components, which camera imposes no limit on the number of original sub-frames.

SUMMARY OF THE INVENTION

The above and other objects of the present invention are achieved, while taking advantage of the availability of panoramic print services, by dividing a laterally elongated panoramic size original frame into a plurality of original sub-frames in the longitudinal direction, and by using the divided original sub-frames sequentially in the longitudinal direction.

According to one embodiment of the invention, eight consecutive scenes are sequentially taken by one shutter release operation on eight original sub-frames formed by two panoramic size original frames each divided into four original sub-frames. There is used a lens plate having a plurality of taking lenses integrally formed thereon. Use of this lens plate requires the lens mounting operation to be performed only once, resulting in an easy adjustment of the focal points of the respective lenses.

According to another embodiment of the present invention, the widths of the inner two original sub-frames are made narrower than that obtained when a panoramic original frame is divided into four equal areas, whereas the right and left outer two original sub-frames are made wider, and the optical axes of the taking lenses thereof are shifted from the centers of the original sub-frames toward the center of the panoramic original frame. When printing a photographic film using a mask, the outer side portions, in the longitudinal direction, of the film are partially cropped. However, with the above-described arrangement, the positions of the main subjects on the right and left two original sub-frames are made the same as those of the inner two original sub-frames on a photoprint.

With the continuous taking camera of the present invention, a plurality of scenes are taken at short time intervals on a plurality of original sub-frames obtained by dividing a panoramic size original frame in the longitudinal direction. Therefore, presently available panoramic print services can be used. With those panoramic print services, a photoprint is made at a magnification factor two times as large as an ordinary photoprint. Therefore, the sub-frame of a photoprint made from an original sub-frame has a size sufficient for observing it easily. In addition, since each printed sub-frame is disposed in the order of time sequence, the order of continuous taking can be easily ascertained.

According to another embodiment of the present invention, eight original sub-frames comprised by upper and lower rows each having four original sub-frames are formed within a 35 mm full size original frame. In this embodiment, the mount of film used is quite small. The order of taking scenes is the same both for the upper row and for the lower row, leaving no doubt as to the order of taking. Also in this embodiment, the sizes of the four outer original sub-frames are made wider, and the optical axes of the corresponding taking lenses are shifted toward the inside.

According to the present invention, eight stationary shutter openings are disposed in the film transporting direction. First and second shutter discs are provided for opening and closing the eight stationary shutter openings. The first shutter disc sequentially opens and closes the first four stationary shutter openings, and then the second shutter disc sequentially opens and closes the remaining four stationary shutter openings. The shutter discs are formed at their peripheries with teeth meshing each other. The first shutter disc is driven by a motor, and the second shutter disc is rotated in cooperation with the first. Each shutter disc is formed with a plurality of movable shutter openings or slits at positions different in distance from the axis of rotation of the disc. Each movable shutter opening sequentially passes the four stationary shutter openings to expose a photographic film. The axis of rotation of the first shutter disc is positioned above the four stationary shutter openings, and the axis of rotation of the second shutter disc is positioned below the remaining four stationary shutter openings. With such an arrangement, the two lens plates each having four stationary shutter openings can be disposed nearer to each other. At the time of exposure, the motor is driven at a high speed so that a high shutter speed can be obtained without shortening the time interval between each exposure.

According to the shutter unit of a continuous taking camera of the present invention, the structure can be simplified, and the rotation speed of the shutter disc can be easily adjusted. Thus, it is easy to set the time interval between each exposure and each shutter speed.

BRIEF DESCRIPTION OF THE DRAWINGS

The above and other objects and advantages of the present invention will become more apparent from the following detailed description when read in connection with the accompanying drawings, in which.

DETAILED DESCRIPTION OF THE PREFERRED EMBODIMENT

Figure 1:
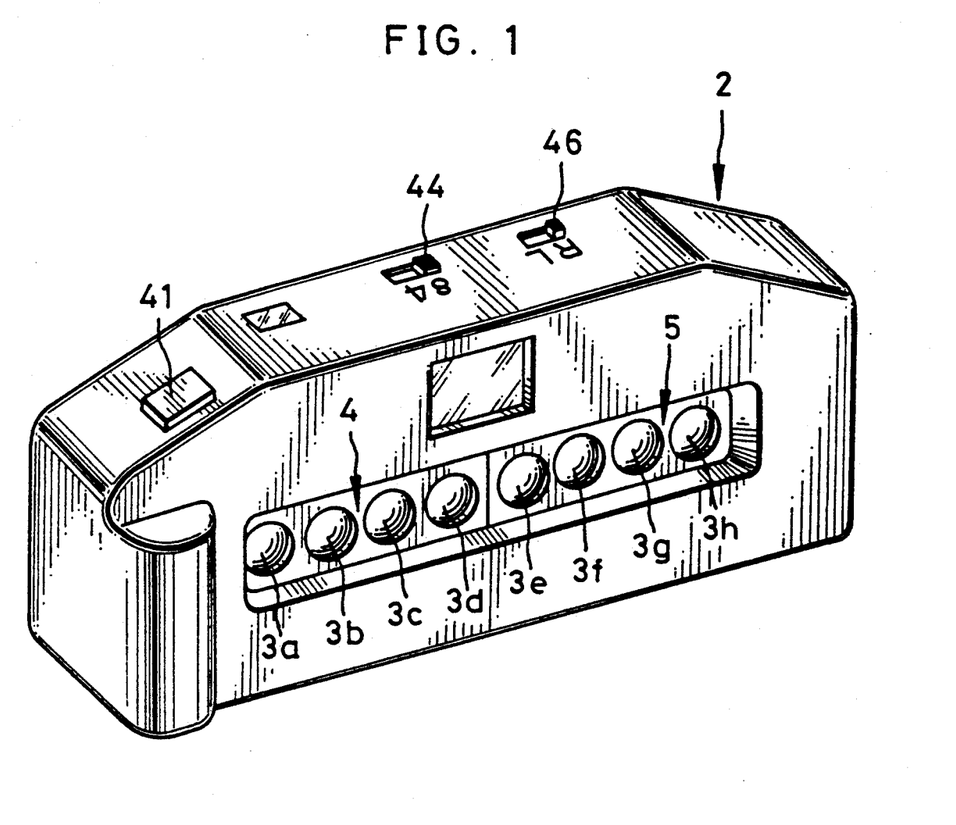
FIG. 1 is a perspective view showing a continuous taking camera according to the present invention.

Referring to FIG. 1, eight taking lenses 3a to 3h are mounted horizontally on the front side of a camera body 2. The optical axes of the taking lenses 3a to 3d and those of the taking lenses 3e to 3h are parallel and are spaced apart a predetermined distance L1. The taking lenses 3a to 3d are formed integrally on a single lens plate 4 molded from transparent resin such as acrylic resin. Similarly, the taking lenses 3e to 3h are formed integrally on a lens plate 5.

Figure 2:
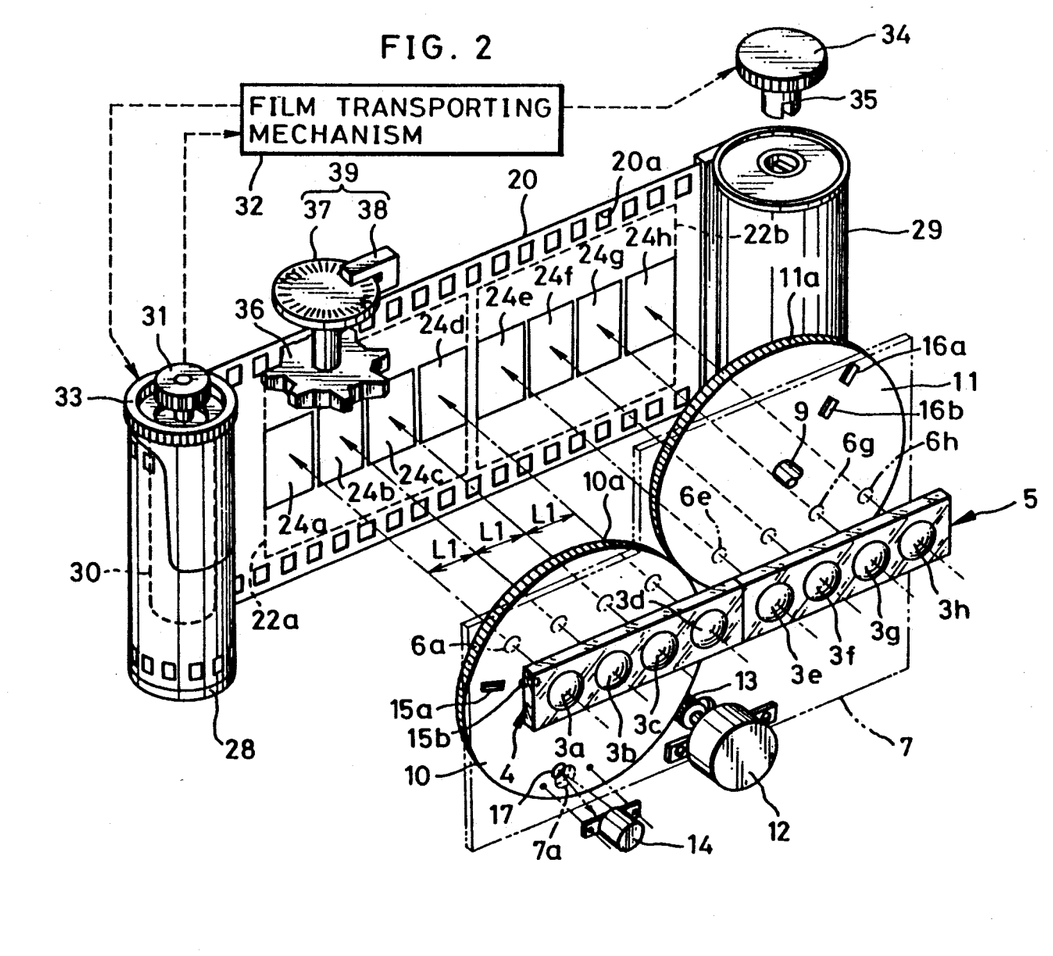
FIG. 2 is an exploded perspective view showing schematically the principal parts of the continuous taking camera shown in FIG. 1.

As is shown in FIG. 2, a shutter base plate 7 is fixedly mounted within the camera body 2. The shutter base plate 7 is formed with eight circular stationary shutter openings 6a to 6h corresponding in position to the taking lenses 3a to 3h. The inner diameter of each of the stationary shutter openings 6a to 6h is the same for all openings. Shafts 8 and 9 are mounted on the shutter base plate 7 respectively below and above a straight line passing through the centers of the stationary shutter openings 6a to 6h, the shafts 8 and 9 rotatably supporting shutter discs 10 and 11, respectively. The distances from shaft 8 to the stationary shutter openings 6a and 6d are equal, and the distances from shaft 8 to the stationary shutter openings 6b and 6c are equal. Similarly, the distances from shaft 9 to the stationary shutter openings 6e and 6h are equal, and the distances from shaft 9 to the stationary shutter openings 6f and 6g are equal.

Teeth 10a, 11a are formed on the outer peripheries of the shutter discs 10 and 11, these teeth being in mesh with each other. A stepping motor 12 is fixedly mounted on the front side of the shutter base plate 7. A drive gear 13 coaxially fixed on the output shaft of the stepping motor 12 meshes with the teeth 10a of the shutter disc 10. A reflection type photosensor 14 is mounted on the shutter base plate 7, the photosensor photoelectrically detecting a reflecting member 17 fixed to the shutter disc 10, through an opening 7a in the shutter base plate 7.

Figure 4:
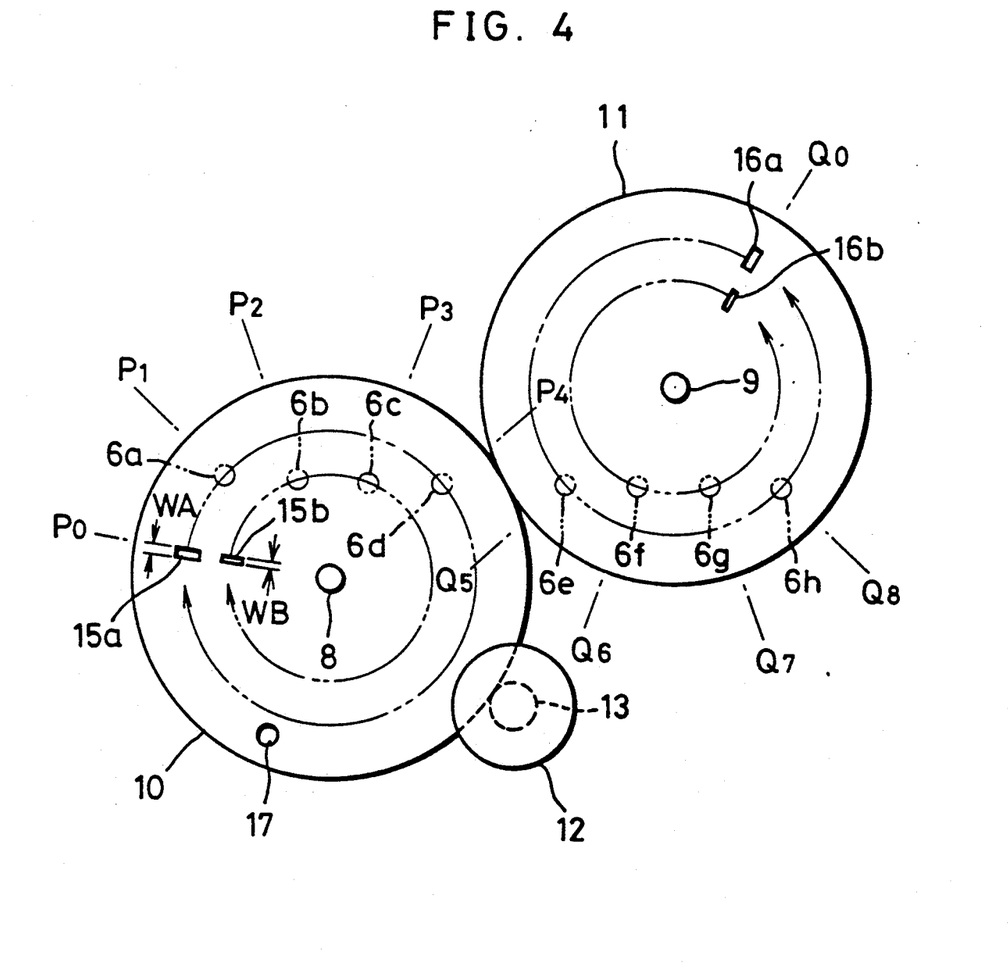
FIG. 4 illustrates the operation of the shutter discs.

As shown in FIG. 4, the shutter discs 10 and 11 are formed each with two rectangular shutter openings or slits 15a, 15b, and 16a, 16b, respectively. The movable shutter openings 15a and 15b are aligned on a straight line passing through the axis of rotation of the shutter disc 10. Similarly, the shutter openings 16a and 16b are aligned on a straight line passing through the axis of rotation of the shutter disc 11. The shutter openings 15a and 15b, or 16a and 16b are not necessarily aligned on the same line, but may be angularly displaced from each other according to the desired photographic timing.

The length of the shutter openings 15a, 15b, 16a and 16b in the radial direction is greater than the inner diameter of the stationary shutter openings 6a to 6h. The width WA of the outer shutter opening 15a in the circumferential direction is greater than the width WB of the inner shutter opening 15b in proportion to their respective distances from the axis of rotation of disc 10. For example, if the width WA of the outer shutter opening 15a is 1 mm, then the width WB of the inner shutter opening 15b is about 0.7 mm. With this arrangement, both shutter openings 15a and 15b provide the same amount of exposure to a photographic film 20. The relation between the widths of the shutter openings 16a and 16b is the same as that of openings 15a and 15b.

As the shutter disc 10 rotates, the shutter opening 15a moves in the clockwise direction from its original position P0 shown in FIG. 4 and passes a first exposure position P1, wherein the stationary shutter opening 6a is opened and closed. As the shutter disc 10 further rotates, the movable shutter opening 15b passes a second exposure position P2, wherein the stationary shutter opening 6b is opened and closed. As the movable shutter openings 15b and 15a pass third and fourth exposure positions P3 and P4, respectively, the stationary shutter openings 6c and 6d are opened and closed.

As the shutter disc 10 rotates in the clockwise direction, the shutter disc 11 rotates in the counterclockwise direction, as the teeth 10a and 11a mesh with each other. After the movable shutter opening 15a passes the fourth exposure position P4, the movable shutter opening 16a of the shutter disc 11 rotates from its original position Q0 to a fifth exposure position Q5. When the movable shutter openings 16a passes the fifth exposure position Q5, the stationary shutter opening 6e is opened and closed. Since the shutter disc 10 rotates until the movable shutter openings 15a and 15b return to the original position P0, the shutter disc 11 therefore continues to rotate in the counterclockwise direction. Thus, when the movable shutter openings 16a and 16b pass the sixth, seventh and eighth exposure positions Q6, Q7 and Q8, the stationary shutter openings 6f, 6g and 6h are opened and closed. The time from when the first stationary shutter opening 6a is opened and closed to when the last stationary shutter opening 6h is opened and closed, is selectively set to be either 1 second or 2 seconds by selecting the rotation speed of the stepping motor 12.

Figure 3:
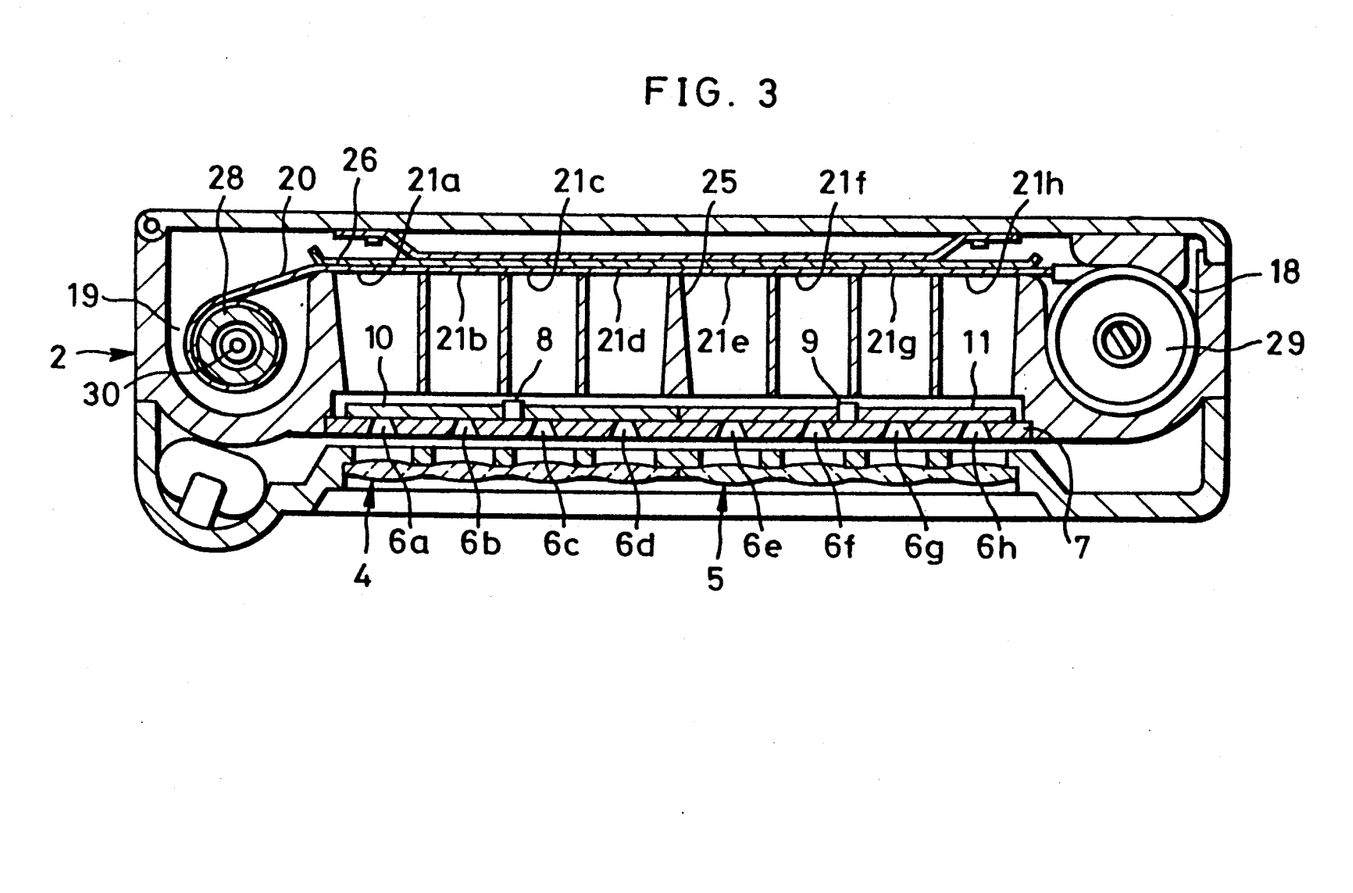
FIG. 3 is a longitudinal cross section in a horizontal plane, of the continuous taking camera shown in FIG. 1.

As is shown in FIG. 3, between a cassette receiving chamber 18 and a film take-up chamber 19 of the camera body 2, eight exposure chambers 21a to 21h are formed along the transporting direction of a photographic film 20 having a width of 35 mm, the eight exposure chambers being separated by partition walls. Exposure apertures for defining frame sizes are formed at the back of the exposure chambers 21a to 21h. The lateral length from the exposure chamber 21a to the exposure chamber 21d and the lateral length form the exposure chamber 21e to the exposure chamber 21h each are the same as the lateral length of one original frame of 35 mm full size. The vertical length of each exposure chamber 21a to 21h is substantially one half the vertical length of one original frame of 35 mm full size, and each exposure chamber 21a to 21h is so disposed as to expose the central area in the vertical direction of each frame of the photographic film 20. When taking images using exposure chambers 21a to 21h, as shown in FIG. 2, four original sub-frames 24a to 24d and four original sub-frames 24e to 24h are formed in two full size frames 22a and 22b.

A laterally elongated image frame having the four original sub-frames 24a to 24d or 24e to 24h has the same size as a standard panoramic size frame (e.g., 13.7±0.4 mm×36 mm) which is obtained when taking an image while light-shielding about 5 mm of each of the upper and lower sides of a 35 mm full size original frame. A relatively large space is provided by a central partition wall 25 between the original sub-frame 24d and original sub-frame 24e as illustrated in FIG. 3. The gap thus defined between the two original sub-frames appears as a black stripe when printed, because it is prevented from being exposed by the rear end surfaces of the partition walls. This black stripe can be avoided, if the rear end surfaces of the partition walls are spaced apart from the photographic film 20 to allow light to fall on the border between the original sub-frames. The positions of the exposure chambers are set such that the widths of the end four original sub-frames 24a, 24d, 24e and 24h are longer than the widths of the other or middle four original sub-frames 24b, 24c, 24f and 24g. Reference numeral 26 designates a film pressure plate.

As is shown in FIG. 2, the photographic film 20 is wound up when a spool 28 mounted in the film take-up chamber 19 rotates in the counterclockwise direction, and is simultaneously pulled out of a cassette 29 loaded within the cassette receiving chamber 18. A film winding motor 30 is mounted within the spool 28, the drive force of the motor 30 being transmitted via a gear 31 to a film transporting mechanism 32. Receiving the drive force from the gear 31, the film transporting mechanism 32 drives the spool 28 via a gear 33 when winding the film, and drives a fork 35 via a gear 34 when rewinding the film into cassette 29. A sprocket wheel 36 engages with perforations 20a and is rotated by movement of the photographic film 20. A rotary encoder 39 coupled to the sprocket wheel 36 is comprised by a signal plate 37 with slits formed radially, and a photosensor 38 for photoelectrically detecting the rotation of the signal plate 37. The photosensor 38 detects the passing slits during movement of the film.

Figure 5:
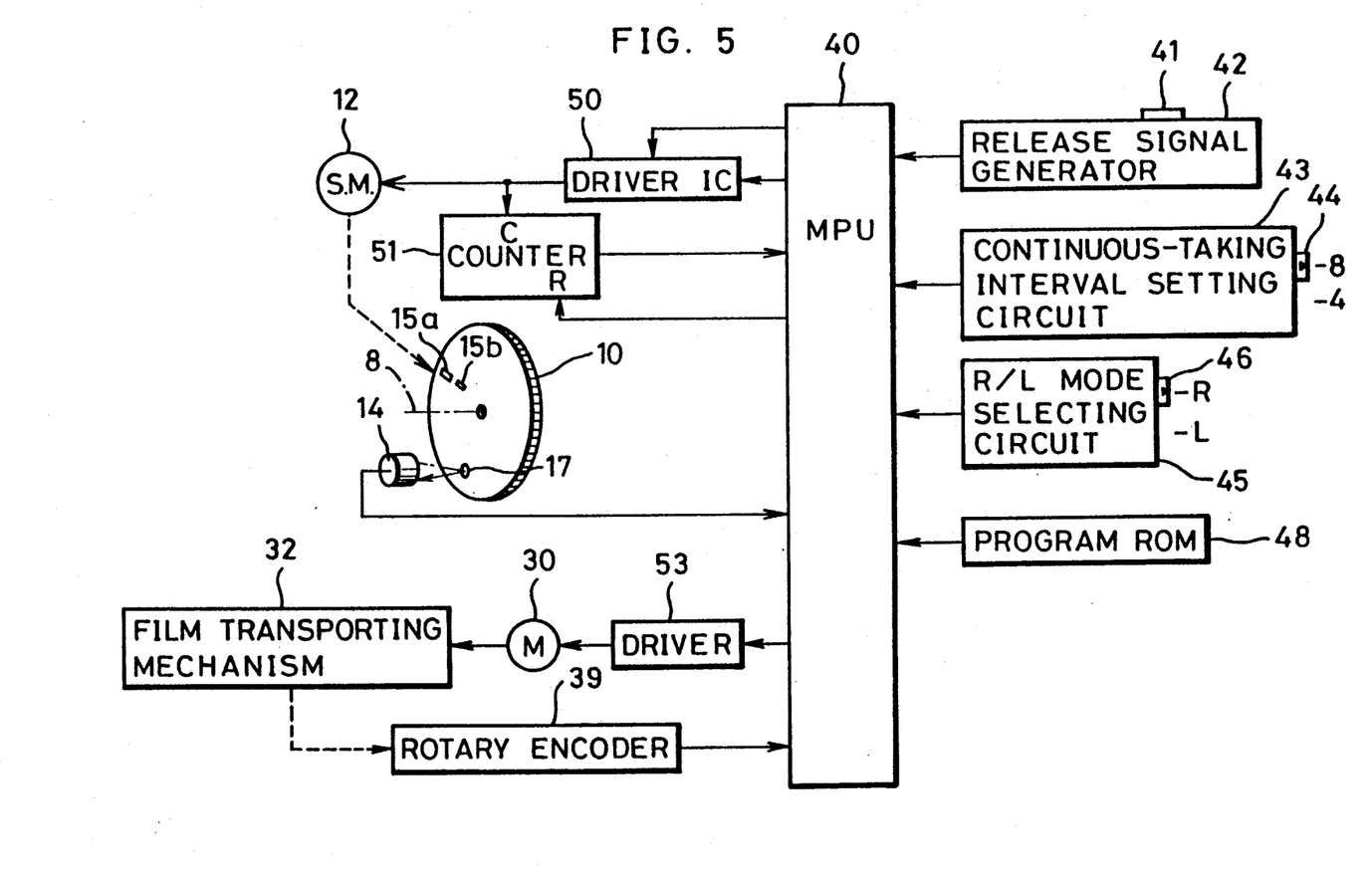
FIG. 5 is a block diagram showing the electrical system of the continuous taking camera shown in FIG. 1.

FIG. 5 is a block diagram showing the circuit arrangement of the continuous taking camera described above. The continuous taking sequence is managed by an MPU 40 which starts the sequence upon reception of a release signal from a release signal generator 42 when a shutter button 41 is depressed. A continuous-taking interval setting circuit 43 sets eight frames per second or four frames per second for continuous taking, in accordance with the set position of a frame number setting knob 44. The number of settings or the continuous taking speed may be adjusted.

An R/L mode selecting circuit 45 selects either a normal rotation direction or a reverse rotation direction of the shutter discs 10 and 11 for the continuous taking, in accordance with the set position of an R/L setting knob 46. When a scene is continuously taken in which a main subject moves toward the right, e.g. a right-handed person playing golf, the R/L setting knob 46 is set to an index R. Then, the R/L mode selecting circuit 45 supplies to MPU 40 a rightward moving mode signal. When a scene is continuously taken in which a main subject moves leftward, e.g. a left-handed golf player, the R/L setting knob 46 is set to an index L so that a leftward moving mode signal is supplied to MPU 40. A program ROM 48 stores a continuous taking sequence program under which a continuous taking sequence is executed in accordance with signals from the continuous-taking interval setting circuit 43 and R/L mode selecting circuit 45.

Upon reception of a control signal and clock signal from MPU 40, a driver IC 50 supplies drive pulses to the stepping motor 12. As is well known, the stepping motor 12 rotates in accordance with the number of supplied drive pulses, so that the rotary angle can be determined from the number of drive pulses and the rotation speed can be controlled from the frequency of drive pulses. The number of drive pulses supplied from the driver IC 50 to the stepping motor 12 is counted by a counter 51. MPU 40 monitors the count of the counter 51, and sends a control signal to the driver IC 50 each time the count reaches a predetermined value. In accordance with the control signal, the driver IC changes the frequency and polarity of drive pulses supplied to the stepping motor 12, thereby to control the speed and rotation direction of the stepping motor 12. When the shutter disc 10 returns to the original position after one continuous taking sequence is completed, the counter 51 is supplied with a reset signal so that the count is cleared to "0". When the photosensor 14 detects the reflecting member 17 fixed on the shutter disc 10, it sends a detection signal to MPU 40. MPU 40 monitors the detection signal from the photosensor 14 to control to return the shutter disc 10 precisely to the original position, as will be described later.

MPU 40 counts the detection signal from the rotary encoder 39 to detect a film feed amount. When a predetermined number of detection signals from the rotary encoder 39 is counted while winding the film, the rotation of the motor 30 is stopped. In such a case, the photographic film 20 is advanced by two full size original frames. Reference numeral 53 represents a driver.

The operation of the continuous taking camera constructed as above will now be described. For continuously taking scenes of golf swings of a right-handed person at eight frames per second starting from a top position scene to a follow-through position scene, the R/L setting knob 46 is set to the index "R", and the frame number setting knob 44 is set to the index "8" for the eight frame mode. In this condition, the shutter disc 10 is rotated in the clockwise direction as seen in FIG. 1, and the stepping motor 12 is controlled to drive at the eight frames per second for continuous taking.

When a subject starts back-swinging and reaches a top position, the shutter button 41 is depressed. Then, the stepping motor 12 is driven to rotate the shutter disc 10 by means of the drive gear 13 in the clockwise direction as seen in FIGS. 2 and 4, and the shutter disc 11 rotates in the counterclockwise direction. As the shutter disc 10 rotates from the original position P0 to the first to fourth exposure positions P1, P2, P3 and P4 shown in FIG. 4, the movable shutter openings 15a and 15b sequentially open and close the stationary shutter openings 6a, 6b, 6c and 6d to take scenes on the original sub-frames 24a, 24b, 24c and 24d. Immediately after the scene for the original sub-frame 24d is taken, the shutter disc 11 reaches the fifth exposure position Q5 starting from the original position Q0 and thereafter passes the sixth to eighth exposure positions Q6, Q7 and Q8. Therefore, the movable shutter openings 16a and 16b sequentially open and close the stationary shutter openings 6e, 6f, 6g and 6h.

Figure 6:
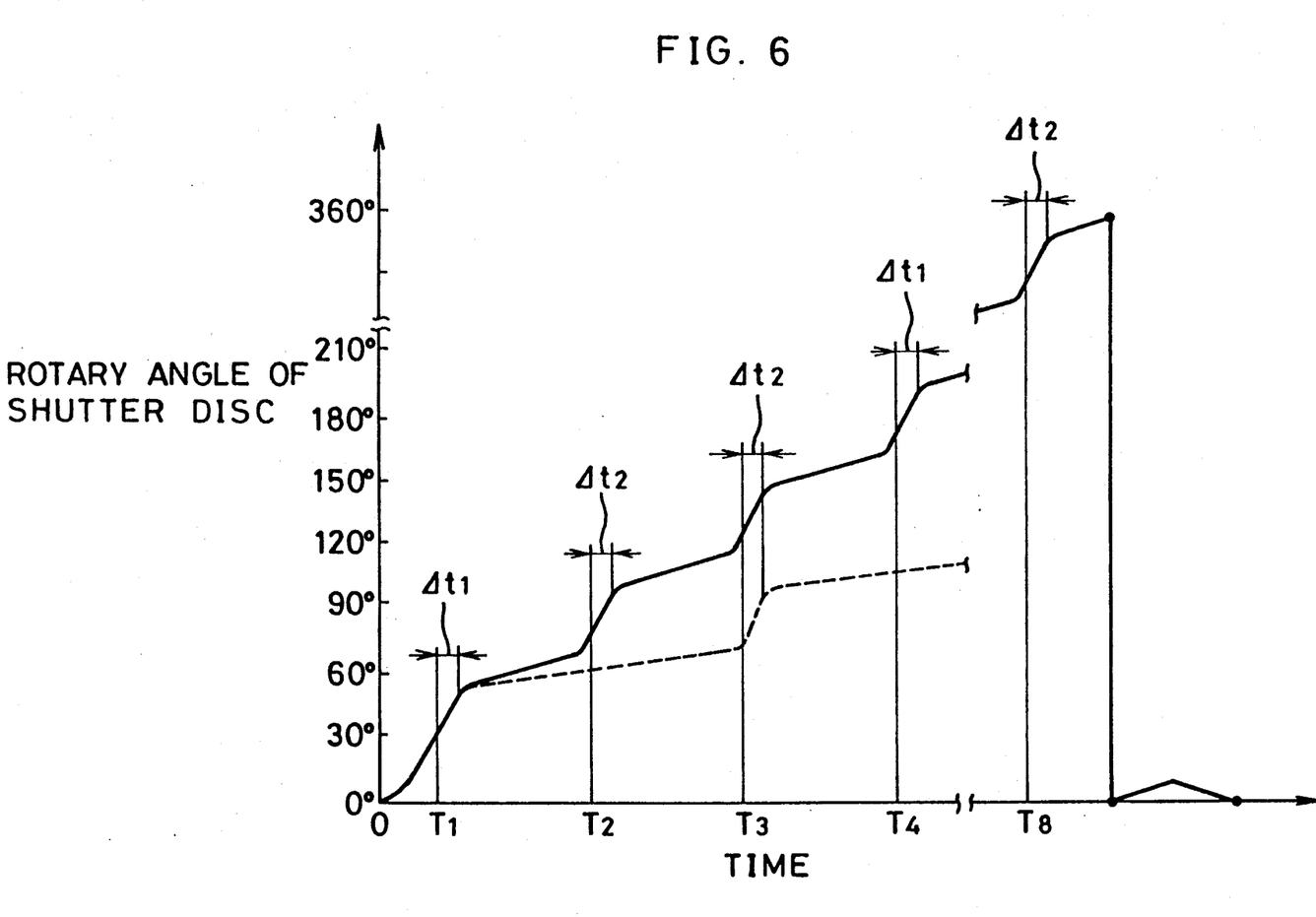
FIG. 6 is a timing chart illustrating the rotation of the shutter disc.

FIG. 6 is a timing chart illustrating continuous taking at eight frames per second. When the shutter button 41 is depressed at time "T=0", the driver IC 50 supplies drive pulses gradually increasing in frequency to the stepping motor 12, so that the stepping motor 12 is driven while being accelerated. As the stepping motor 12 is driven, the shutter disc 10 is rotated while being accelerated. When the shutter disc 10 rotates by 30° from the original position P0 at time T1, the movable shutter opening 15a reaches the position corresponding to the stationary shutter opening 6a to take the scene for the first sub-frame 24a. Thereafter, at times T2, T3, T4, . . . , T8, the scenes for the sub-frames 24b, 24c, 24d, . . . , 24h are taken.

As is apparent from FIG. 6, the shutter discs 10 and 11 are rotated at a high speed before taking each scene, and rotated at a low speed after taking each scene. In this manner, it is possible to extend the continuous-taking interval to about 100 to 500 msec., while allowing an exposure time of about 4 msec. for example. Since the rotary position of the shutter disc 10 corresponds to the count of the counter 51, such rotation control of the shutter discs 10 and 11 can be executed by the MPU 40 changing the frequency of drive pulses supplied to the stepping motor 12 each time the count of counter 51 reaches a predetermined value.

The radially inner movable shutter openings 15b and 16b of the shutter discs 10 and 11 have a lower circumferential speed than the radially outer movable shutter openings 15a and 16a, in proportion to the distance from the axis of rotation. For example, the time $\Delta t1$ (shutter speed) required for the movable shutter opening 15a to pass the stationary shutter opening 6a is related to a time $\Delta t2$ required for the movable shutter opening 15b to pass the stationary shutter opening 6b, by the following inequality $$\Delta t1 < \Delta t2$$

Therefore, if the inner diameters of the stationary shutter openings 6a and 6b are set to values equal to the widths WA of the movable shutter openings 15a and 15b, the exposure amount for the sub-frame 24b will be greater than that for the sub-frame 24a. Photoprints are often observed by placing them in sequence, particularly in the case of continuously taken photoprints. Therefore, a difference in exposure amounts would be conspicuous. In order to deal with this, in this embodiment, the widths WA of the outer movable shutter 15a and 16a are greater than the widths WB of the radially inner movable shutter openings 15b and 16b, in proportion to the distance from the shafts 8 and 9, thereby to make the exposure amount constant for each of the sub-frames 24a to 24h. Obviously, constant exposure may be obtained alternatively by making the inner diameters of the stationary shutter openings 6b, 6c, 6f and 6g over which the radially inner shutter openings 15b and 16b pass, smaller than those of the other stationary shutter openings.

When the shutter discs 10 and 11 rotate by 360° and return to the original positions, the photosensor 14 photoelectrically detects the reflecting member 17. Then MPU 40 supplies several drive pulses to the stepping motor 12 via the driver IC 50. Thereafter, the stepping motor 12 is rotated slowly in the reverse direction. When the photosensor 14 again detects the reflecting member 17, the stepping motor 12 is stopped. By stopping the stepping motor 12 when the photosensor 14 detects the reflecting member 17 the second time, the shutter disc 10 can be stopped precisely at the original position.

After taking scenes for the eight sub-frames 24a to 24h on the photographic film 20, the motor 30 is driven by the driver 53 to advance the photographic film 20. When the rotary encoder 39 detects that the film has been fed by two full size original frames, the motor is stopped to enter the stand-by state for the next continuous taking.

Figure 7:
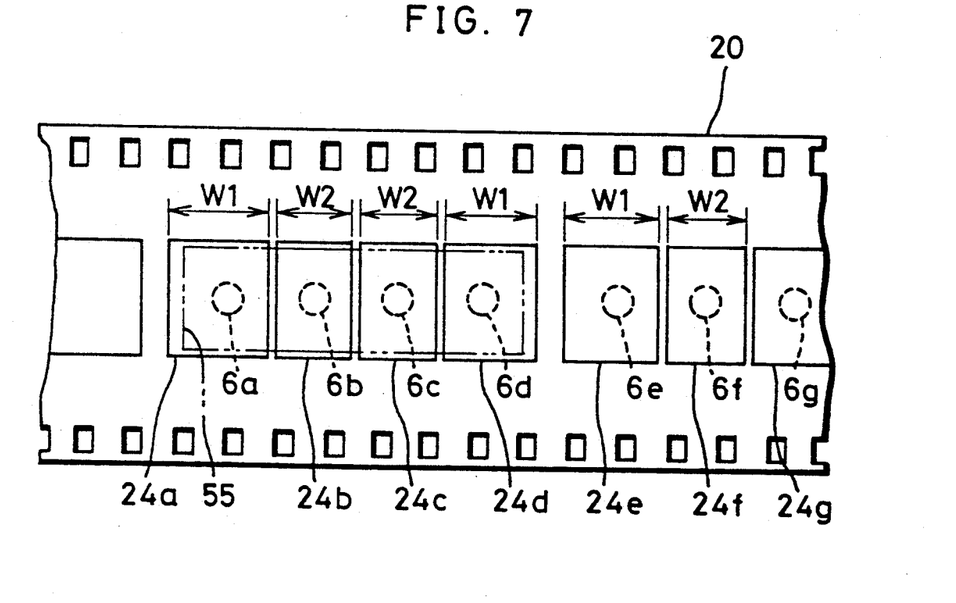
FIG. 7 shows a fragment of photographic film taken with the continuous taking camera shown in FIG. 2.

FIG. 7 shows a photographic film 20 with scenes continuously taken. As already described, the four sub-frames 24a to 24d as a whole have the same size as a panoramic size original frame. Therefore, the sub-frames 24a to 24d can be printed on a paper corresponding in size to two L size photoprints, by using panoramic print services available at present. Each photoprint obtained from each one of the sub-frames has also a sufficiently large size.

Figure 8:
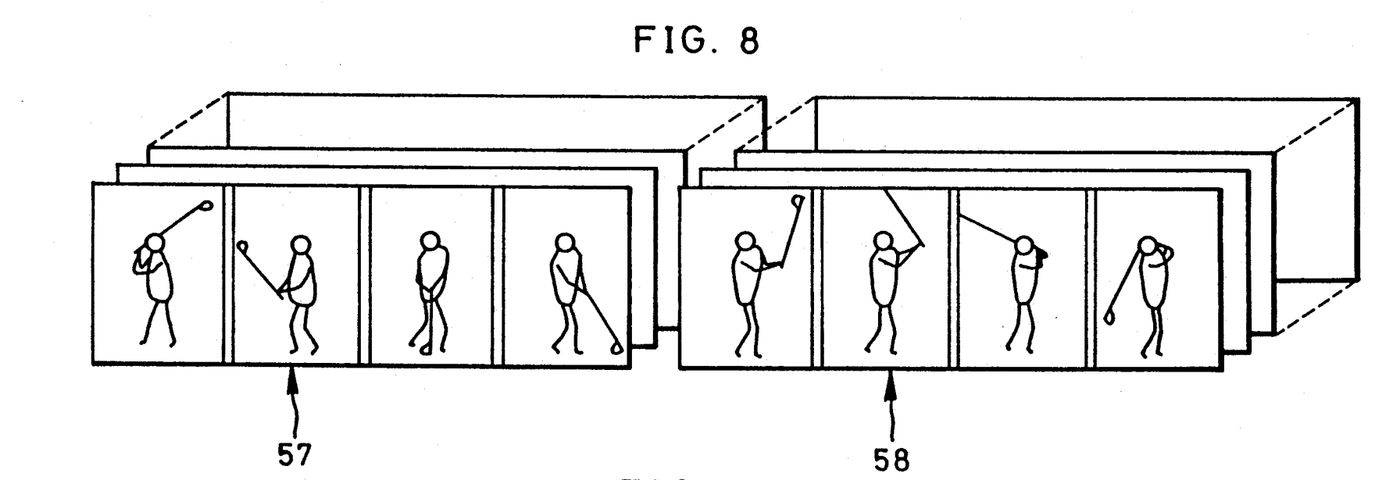
FIGS. 8 and 9 show photoprints obtained using continuously taken original sub-frames.

Panorama print services available at present make photoprints on the one 35 mm full size frame unit basis. Therefore, as is shown in FIG. 8, photoprints 57 and 58 each having four consecutive frames are obtained from the sub-frames 24a to 24h. If the photoprints 57 and 58 are laid end to end, photoprints of continuous scenes from one continuous taking are disposed side by side in time sequence, thereby reproducing the continuous scenes in a very effective manner.

In panoramic print services, a film mask is used having an aperture size indicated by a two-dot chain line of FIG. 7. This film mask causes optical vignetting at the end portions of the outer sub-frames 24a and 24d. If the panoramic size original frame is simply divided into four equal areas to form the four sub-frames, such an optical vignetting causes a difference in the positions of the main subject on the outer sub-frames from those on the inner or middle sub-frames. However, in this embodiment, even if optical vignetting is caused by the film mask, the positions of the main subject on the four sub-frames are made constant. This is achieved by making the widths W1 of the outer sub-frames 24a and 24d greater than the widths W2 of the inner or middle sub-frames 24b and 24c. In addition, the positions of the stationary shutter openings 6a and 6d are shifted inwardly relative to the centers of the sub-frames 24a and 24d, as shown by broken lines in FIG. 7. It is obvious that the centers of the stationary shutter openings 6a to 6d are aligned with the optical axes of the taking lenses 3a to 3d. Thus, the optical axes of the taking lenses 3a to 3d are shifted inwardly relative to the centers of the sub-frames which are obtained by simply dividing the panoramic size frame into four equal areas, with the distance between adjacent optical axes set to L1. Therefore, after printing using the film mask of available panoramic print services, the positions of main subjects on the outer sub-frames 24a and 24d as well as those on the inner sub-frames 24b and 24c become constant, thereby obtaining continuously taken photoprints with neatly aligned main subjects.

The continuous taking camera described above can continuously take scenes by reversely rotating the stepping motor 12. For example, in continuously taking the scenes of golf swings of a left-handed golf player, after the R/L setting knob 46 is set to an index "L", the shutter button 41 is depressed. If the leftward moving mode signal has been supplied from the R/L mode selecting circuit 45 when the release signal is entered, MPU 40 supplies the driver IC 50 a reverse drive control signal so that the driver IC 50 supplies drive pulses of reverse polarity to the stepping motor 12.

Figure 9:
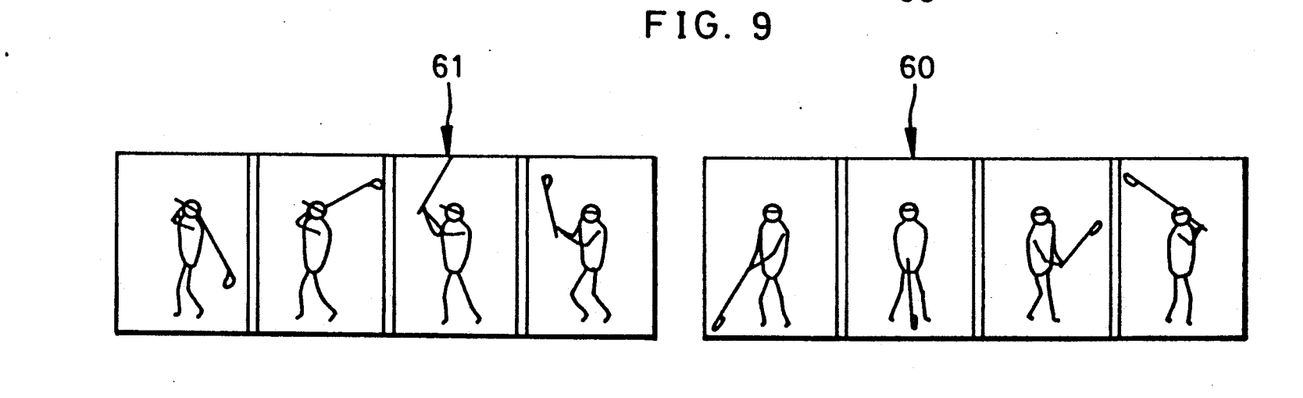

As the stepping motor 12 is reversely rotated, the shutter disc 10 is rotated in the counterclockwise direction, and the shutter disc 11 is rotated in the clockwise direction, to sequentially take scenes for the sub-frames 24h, 24g, 24f, . . . , 24a. The sub-frames 24h to 24a are printed to obtain two photoprints 60 and 61 such as shown in FIG. 9. The frames read from right to left in time sequence, allowing the reproduction of continuously taken scenes which are easy to observe, following the motion of a left-handed player.

For continuously taking scenes that continue to change for two seconds or so, the frame number setting knob 44 is set to an index "4". Then, MPU 40 sends a control signal for four frames per second to the driver IC 50. The driver IC 50 controls the shutter discs 10 and 11 while maintaining constant the rotation speeds of the shutter discs 10 and 11 during exposure and reducing the rotation speeds between exposure operations, so as to obtain the shutter speed $\Delta t1$ and $\Delta t2$ shown in FIG. 6. As a result, as indicated by a broken line in FIG. 6, a scene for the sub-frame 24a is taken at time T1 and that for the sub-frame 24b at T3, thereby taking the scenes for the eight sub-frames 24a to 24h in 2 seconds.

The scene taking interval can be changed by adjusting the rotation speed of the stepping motor 12. Therefore, taking into consideration that the speed of motion of a scene is slow at the start and at end of the motion, it is possible, for example, to increase the time period between taking the scenes for the sub-frames 24a and 24b, and the time period between taking the scenes for the sub-frames 24g and 24h.

Figure 11:
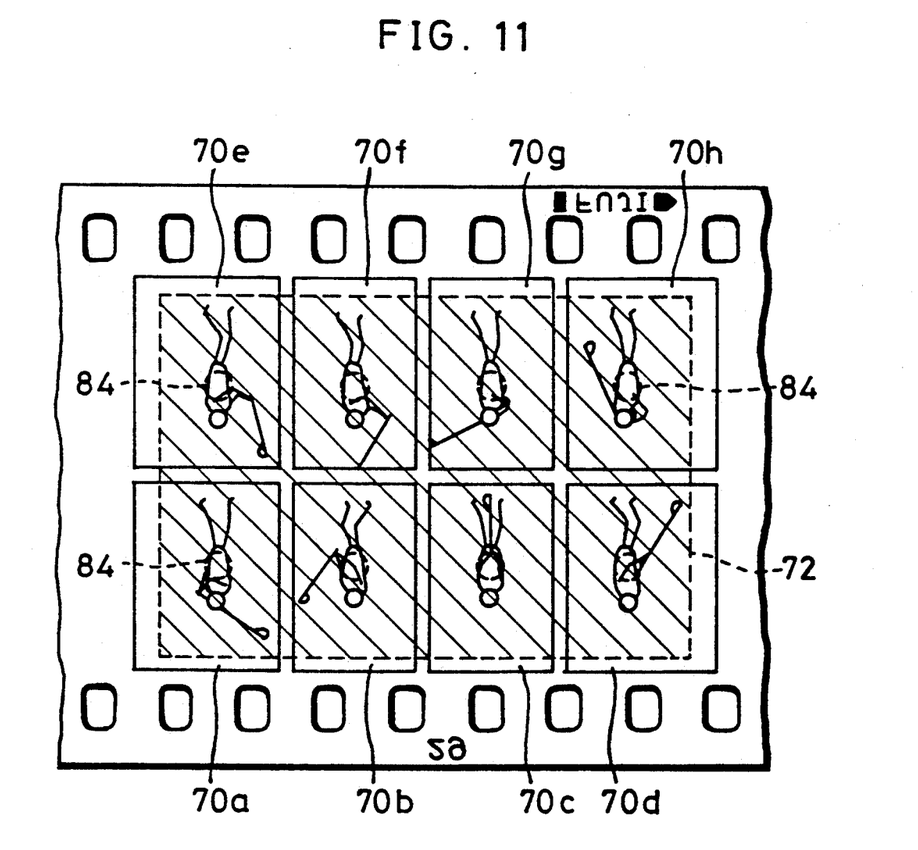
FIG. 11 shows a fragment of photographic film taken with the continuous taking camera shown in FIG. 10.

FIG. 11 shows an embodiment wherein within a single full size original frame, four sub-frames 70a and 70d are taken along the upper row, and four sub-frames 70e to 70h are taken along the lower row. This embodiment provides only a small area for each sub-frame. However, the amount of photographic film consumed is quite small. Obviously, if the upper and lower rows are panoramically printed separately, sufficiently large photoprints can be obtained such as those shown in FIG. 8. In this embodiment also, in order to make the positions of the main subject substantially the same for each sub-frame, the stationary shutter openings 71a, 71d, 71e and 71h for the outer sub-frames 70a, 70d, 70e and 70h are shifted slightly inward, stationary shutter openings 71a to 71d for the sub-frames 70a to 70d along the lower row are shifted slightly up, and stationary shutter openings 71e to 71h for the sub-frames 70e to 70h along the upper row are shifted slightly down. In this manner, the positions of main subject on the photoprints can be set generally at the center of each frame. Reference numeral 72 in FIG. 11 designates the aperture of the film mask, and the hatched portion indicates the area within which the scenes are printed.

Figure 10:
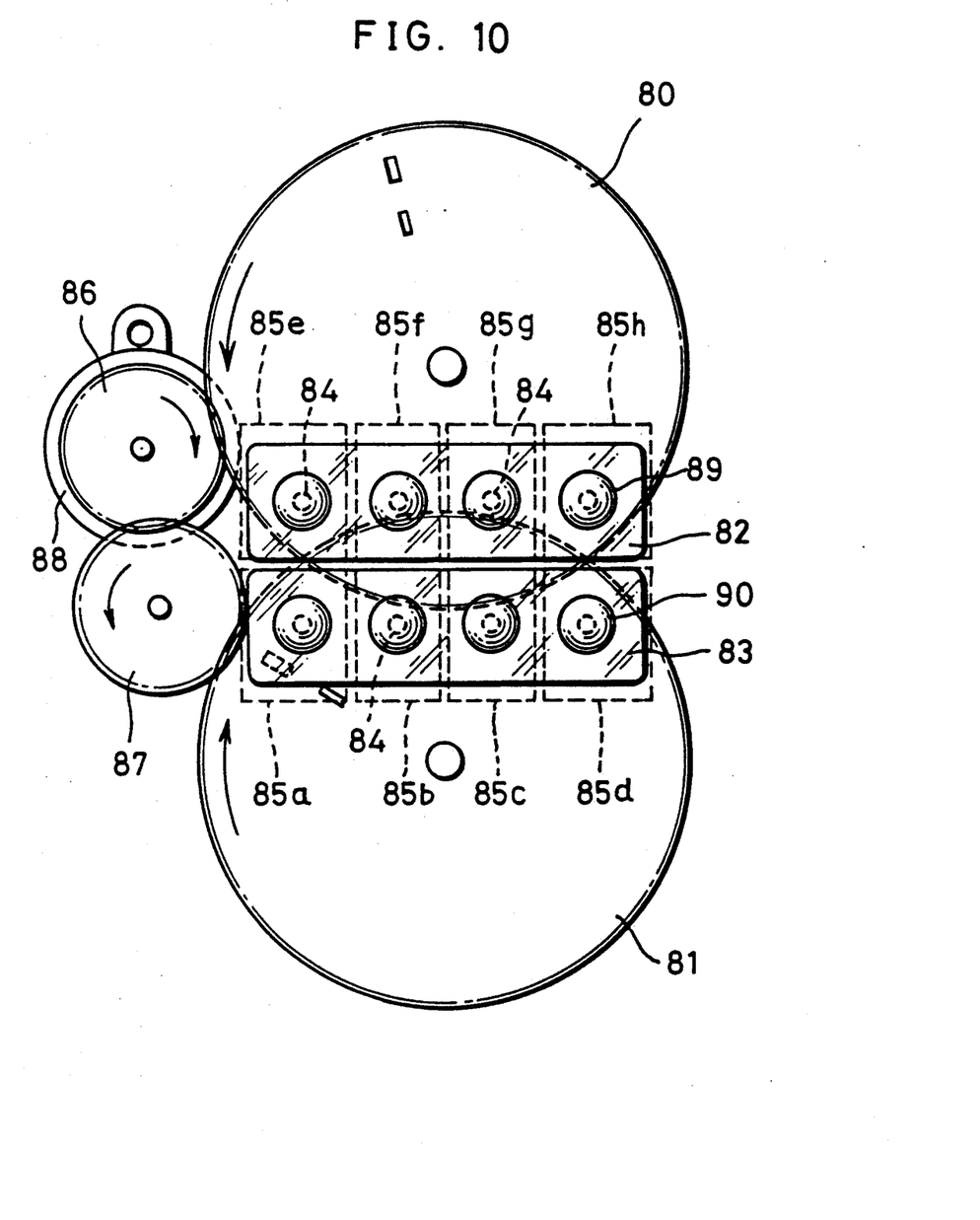
FIG. 10 shows schematically a continuous taking camera which takes upper and lower rows of four original subframes.

The positions of the sub-frames shown in FIG. 11 are realized by using a continuous taking camera whose main structure is shown in FIG. 10. In this continuous taking camera, two shutter discs 80 and 81 are arranged in the vertical direction, the two shutter discs 80 and 81 partly overlapping. The shutter discs 80 and 81 are rotated by means of a drive gear 86 and intermediate gear 87, the drive gear 86 being rotated by a stepping motor 88. Four taking lenses 89 are integrally mounted on a lens base plate 82 at a constant pitch. Four taking lenses 90 are also integrally mounted on a lens base plate 83. Reference numerals 85a to 85h designate exposure chambers, and reference numeral 84 designates a stationary shutter opening. In this continuous taking camera, exposure is carried out in the order from the exposure chamber 85a to the exposure chamber 85h so as to create sub-frames 70a to 70h as illustrated in FIG. 11.

Figure 12:
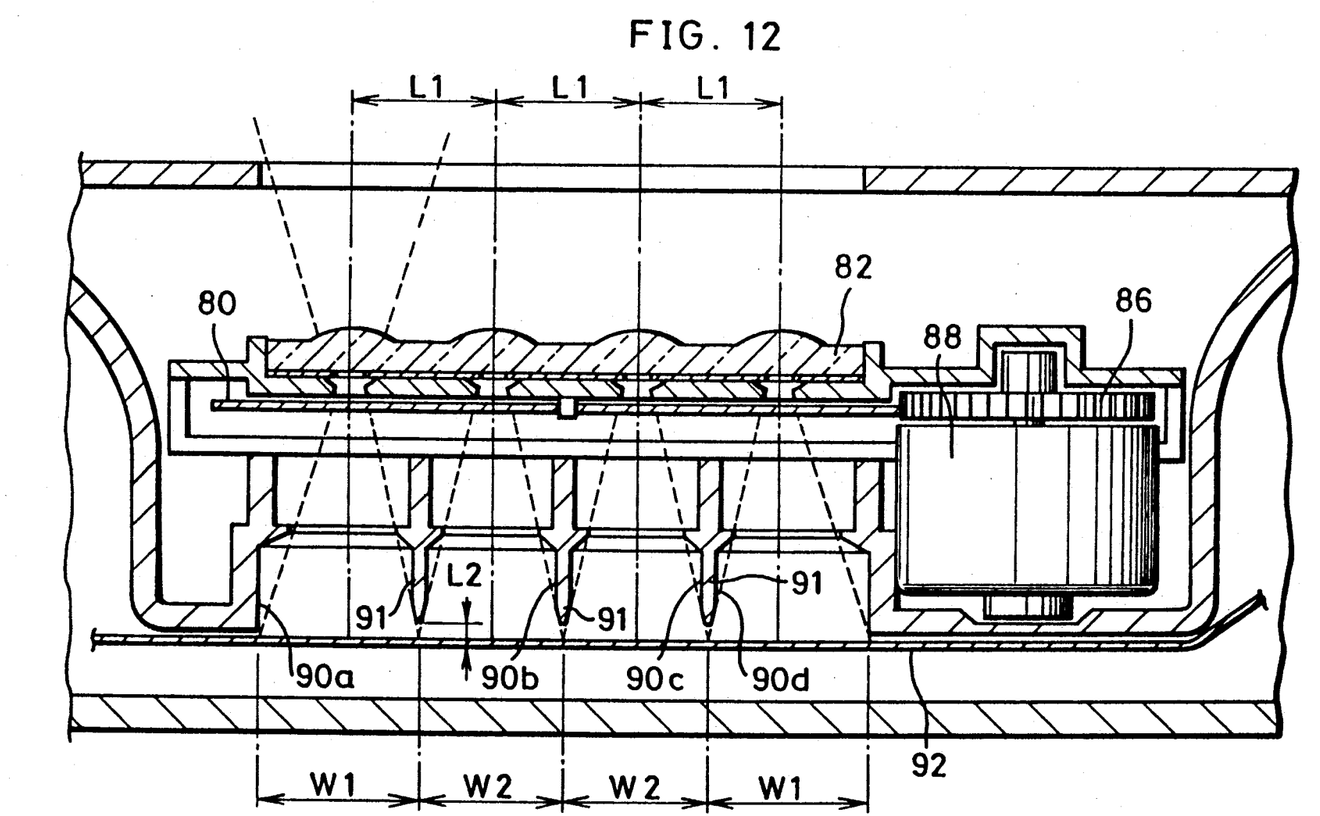
FIG. 12 is a fragmentary cross section showing the structure of the continuous taking camera shown in FIG. 10, which avoids the printing of a black stripe at the border between original sub-frames.

FIG. 12 shows another embodiment wherein, in order to avoid formation of the mentioned black stripe at the border between adjacent sub-frames, partition walls 91 defining exposure chambers 90a to 90d are spaced apart from a photographic film 92 by a distance L2. Furthermore, in order to allow light to fall on the border portion of each sub-frame, the rear end surface of each partition wall 91 is tapered.

In the above embodiments, two lens plates each mounting four lenses are used. Instead of this, four lens plates each mounting two lenses, or a single lens plate mounting eight lenses may also be used. Furthermore, in the above embodiments, two shutter discs are used to continuously take eight scenes on two 35 mm full size frames by one continuous taking. Instead of this, eight shutter discs each formed with a single movable shutter opening may be used to continuously take eight frame scenes disposed side by side. Still further, three 35 mm full size frames may be used at one continuous taking to continuously take twelve scenes on twelve original sub-frames. Also, the number of original sub-frames to be taken on a 35 mm full size frame may, instead of four, be two, three, five and so on. In this case, the number of movable shutter openings and the number of slits are increased or decreased in accordance with the number of sub-frames. In this above embodiments, although one stepping motor drives two shutter discs operating in cooperation with each other, each shutter disc may be driven independently by a separate stepping motor at desired timings.

In the embodiment shown in FIG. 2, a panoramic size original frame is divided into a plurality of sub-frames. Instead, a full size original frame may be divided into a plurality of vertically elongated sub-frames. Even such sub-frame can be printed as photoprints shown in FIG. 8 by using the film mask shown in FIG. 7 to crop the upper and lower portions of each frame. Film advance may be manually performed by operating a film take-up knob.

Although the present invention has been fully described by way of the preferred embodiments thereof with reference to the accompanying drawings, various changes and modifications will be apparent to those of working skill in this field. Therefore, unless otherwise these changes and modifications depart from the scope of the present invention, they should be construed as included therein.

What is claimed is:

1. A continuous taking camera comprising:
means defining at least three exposure chambers disposed linearly in the direction of advance of a photographic film such that at least one full size original frame of said photographic film is divided into at least three sub-frames;
at least three taking lenses each disposed in front of a respective one of said exposure chambers; and
shutter means for taking scenes for said at least three sub-frames, said shutter means comprising at least one shutter disc rotatable about an axis and having two movable shutter openings, a fixed plate for rotatably supporting said shutter disc, and at least three stationary shutter openings being linearly formed in said fixed plate in registry respectively with said exposure chambers, said two movable shutter openings lying on a straight line passing through said axis and differing in distance from said axis for sequentially opening and closing said three stationary shutter openings.

2. A continuous taking camera comprising:
means defining two exposure chamber groups each including four exposure chambers disposed linearly in the direction of advance of a photographic film such that at least one full size original frame of said photographic film is divided into two series of four sub-frames each;
eight taking lenses one disposed in front of each of the eight exposure chambers; and
shutter means for sequentially taking scenes for the eight sub-frames, said shutter means comprising two shutter discs one for each of said exposure chamber group, said shutter discs each having an axis of rotation, a fixed plate for rotatably supporting said shutter discs, said shutter discs each having two movable shutter openings, said fixed plate having eight stationary shutter openings linearly formed to register one with each of said eight exposure chambers, said two movable shutter openings lying on a straight line passing through the associated said axis and differing in distance from said associated axis, and each said movable shutter opening passing before two of said stationary shutter openings.

3. A continuous taking camera according to claim 2, wherein said eight exposure chambers are disposed linearly in the direction of advance of said photographic film, two full size original frames being disposed behind said eight exposure chambers, each of said sub-frames having a size obtained by dividing a panoramic size original frame into four areas, and said panoramic size original frame having a size such that the upper and lower sides of said full size original frame are partially masked.

4. A continuous taking camera according to claim 2, wherein said two exposure chamber groups are arranged in upper and lower rows, one full size original frame being disposed behind said two exposure chamber groups, each of said sub-frames having a size obtained when said full size original frame is divided into the upper and lower rows each row being divided into four areas.

5. A continuous taking camera according to claim 3 or 4, wherein said two shutter discs are rotated by a motor.

6. A continuous taking camera according to claim 5, further comprising means for changing the rotation direction of said motor.

7. A continuous taking camera according to claim 6, wherein said motor rotates at a high speed in a section wherein either of said movable shutter openings passes said stationary shutter openings, and rotates at a low speed in a section wherein no movable shutter openings register with said stationary shutter openings.

8. A continuous taking camera comprising:

means defining a plurality of exposure chambers disposed linearly in the direction of advance of a photographic film such that at least one full size original frame of said photographic film is divided into a plurality of sub-frames;

a plurality of taking lenses each disposed in front of a respective one of said plurality of exposure chambers; and shutter means for allowing light from a continuously taken scene to fall on each of said plurality of exposure chambers, said shutter means being actuable once to take sequence scenes successively for said plurality of sub-frames;

wherein each of said plurality of sub-frames has a size obtained when dividing a panoramic size original frame into a plurality of areas, and said panoramic size original frame has a size such that upper and lower sides of said full size original frame are partially masked.

9. A continuous taking camera according to claim 8, wherein the rear end surface of a partition wall between adjacent ones of said plurality of exposure chambers is spaced from said photographic film so as to expose each border area between adjacent ones of said plurality of sub-frames.

10. A continuous taking camera according to claim 8, wherein said plurality of taking lenses are mounted on a single plate.

11. A continuous taking camera comprising:

means defining a plurality of exposure chambers disposed linearly in the direction of advance of a photographic film such that at least one full size original frame of said photographic film is divided into a plurality of sub-frames;

a plurality of taking lenses each disposed in front of a respective one of said plurality of exposure chambers; and shutter means for allowing light from a continuously taken scene to fall on each of said plurality of exposure chambers, said shutter means being actuable once to take sequence scenes successively for said plurality of sub-frames;

wherein said sub-frames include at least three sub-frames and the two end frames among said at least three sub-frames disposed linearly in the longitudinal direction of said photographic film have widths greater than the width of at least one middle sub-frame, and the two taking lenses for said two end sub-frames are shifted from the centers of said end sub-frames toward the center of said at least one middle sub-frame.

12. A continuous taking camera comprising:

means defining a plurality of exposure chambers disposed linearly in the direction of advance of a photographic film such that at least one full size original frame of said photographic film is divided into a plurality of sub-frames;

a plurality of taking lenses each disposed in front of a respective one of said plurality of exposure chambers; and shutter means for allowing light from a continuously taken scene to fall on each of said plurality of exposure chambers, said shutter means being actuable once to take sequence scenes successively for said plurality of sub-frames;

wherein said shutter means comprises at least one shutter disc having at least two movable shutter openings, a fixed plate for rotatably supporting said shutter disc, and a plurality of stationary shutter openings before which said movable shutter openings sequentially pass, said plurality of stationary shutter openings being linearly formed in said fixed plate with the spacing of said plurality of exposure chambers.

13. A continuous taking camera according to claim 12, wherein said two movable shutter openings lie on the same straight line passing through the axis of rotation of said shutter disc and differ in distance from said axis and pass before respectively two of said stationary shutter openings.

14. A continuous taking camera according to claim 13, wherein said movable shutter opening disposed at a greater distance from said axis is a radially disposed slot.

15. A continuous taking camera according to claim 12, wherein said at least one shutter disc is rotated by a motor.

16. A continuous taking camera according to claim 15, further comprising means for changing the rotation direction of said motor.

17. A continuous taking camera according to claim 15, wherein said motor rotates at a high speed in a section where either of said movable shutter openings passes said stationary shutter opening, and rotates at a low speed in a section where no movable shutter openings register with said stationary shutter openings.

18. A continuous taking camera according to claim 12, there being two said shutter discs.

19. A continuous taking camera according to claim 18, wherein said two shutter discs are coupled together by teeth formed on the outer peripheries thereof, said one of said two shutter discs is driven by said motor.

20. A continuous taking camera according to claim 12, further including means for detecting an original position of said at least one shutter disc, said detecting means comprising an aperture formed in said at least one shutter disc and a photosensor for detecting said aperture.

* * * * *